United States Patent [19] | [11] 4,115,000
Mischo et al. | [45] Sep. 19, 1978

[54] APPARATUS FOR NOTCHING OF WEBS

[75] Inventors: Klaus Mischo, Munich; Traugott Liermann, Unterhaching, both of Fed. Rep. of Germany

[73] Assignee: AGFA-Gevaert AG, Leverkusen, Fed. Rep. of Germany

[21] Appl. No.: 792,595

[22] Filed: May 2, 1977

[30] Foreign Application Priority Data

Apr. 30, 1976 [DE] Fed. Rep. of Germany ....... 2619375

[51] Int. Cl.$^{2}$ .......................... G03B 29/00; B26D 1/12
[52] U.S. Cl. .......................................... 355/29; 83/671; 83/917; 234/130
[58] Field of Search ...................... 355/28, 29; 234/47, 234/130; 83/917, 5, 665, 668, 671, 676; 346/78, 100, 141; 352/130, 122

[56] References Cited

U.S. PATENT DOCUMENTS

| | | | |
|---|---|---|---|
| 2,782,678 | 2/1957 | Taylor | 355/29 |
| 3,148,573 | 9/1964 | Bender | 83/671 X |
| 3,242,785 | 3/1966 | Schieven et al. | 83/671 X |
| 3,812,753 | 5/1974 | Kiejzik | 83/917 X |

*Primary Examiner*—Richard A. Wintercorn
*Attorney, Agent, or Firm*—Michael J. Striker

[57] ABSTRACT

An apparatus for notching an edge of a strip of photographic film has an arrangement for advancing the strip in a path. Laterally adjacent the path is located a wheel which rotates intermittently or continuously and which is provided with one (or several circumferentially spaced) punching die(s) provided adjacent the periphery of the wheel. A counter-punch is provided with which the die(s) cooperate(s) so as to notch a longitudinal edge of the strip when the wheel rotates.

12 Claims, 3 Drawing Figures

DRIVE A
DRIVE B

APPARATUS FOR NOTCHING OF WEBS

BACKGROUND OF THE INVENTION

This invention relates to an apparatus for notching an edge of an elongated web, particularly (but not exclusively) for notching a longitudinal edge of a strip of photographic film.

Equipment of the general type here under discussion is used in the photographic field for various purposes. For example, in modern film-processing laboratories it is customary to develop a whole series of films (each film may come from a different customer) and thereafter to connect the individual films endwise so as to form a long (composite) strip of film which is then passed through automated copying machinery (a printer). In preparation for this printing operation the equipment here under discussion may be used to form in a longitudinal edge of the long film strip a notch opposite each film frame to be copied; these notches are then sensed and thus serve to control the operation of the printer and/or associated devices, e.g. to determine where the respective film frame must be located before printing begins. Another use of such equipment is to form film strip edges with notches which then serve (e.g. in a press-splicer) to identify where film strips (or sections thereof) are to be spliced together.

According to a prior-art proposal the film strip(s) is (are) photoelectrically scanned to determine where the blank (transverse) film portions are located which separate successive film frames from one another. Whenever one of these portions is sensed, a signal is generated which triggers operation of the notching equipment. The notching itself is usually performed by a reciprocating die or punch.

This type of equipment is no longer suitable for today's high-performance photo-finishing installations. The operations of the devices used in such installations e.g. photo-electric scanners, splicers, printers, and the like) can all be carried out at high speed, a factor which is essential both for economic reasons and to meet the customer demand for quick return of the developed and printed film. The speed of operation of these devices is, however, limited by the slowest operation in the chain: the time required for producing the notches because the notching equipment requires for each operating (notch-forming) cycle a time interval which is composed of the times for the reciprocation of the punch between its operative and retracted positions. If it were not for the delay resulting from this aspect, the photo-finishing operation (of which the notching is only one part, as indicated above) could proceed much faster.

Another objectionable aspect of notch-forming by means of reciprocating punches is that tacky adhesive tends to cling to the punch when a notch is formed (purposely or otherwise) in a splice, i.e. where two film strips are connected by the (adhesive) splice.

SUMMARY OF THE INVENTION

It is an object of the invention to overcome the disadvantages of the prior art.

A more particular object is to provide an apparatus of the type under discussion which makes it possible to produce a substantially higher number of notches per unit time than the prior art is capable of doing.

Still a further object is to produce such an apparatus in which the danger of punch or die contamination with splice adhesives is avoided.

A concomitant object is to provide such an apparatus which is simple in its construction and which, therefore, is relatively inexpensive to build and is very reliable in operation.

In pursuance of these objects and of others which will become apparent hereafter, one feature of the invention resides in an apparatus for notching an edge of an elongated web, particularly of a strip of photographic film, the apparatus comprising means for advancing an elongated web in a path; and means for notching a longitudinal edge of the web, including a wheel mounted for rotation adjacent the path, and at least one punching die on the wheel adjacent the periphery thereof and operative for punching notches in the longitudinal edge of the web during rotation of the wheel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

The structure

Figures 1, 2, 3:
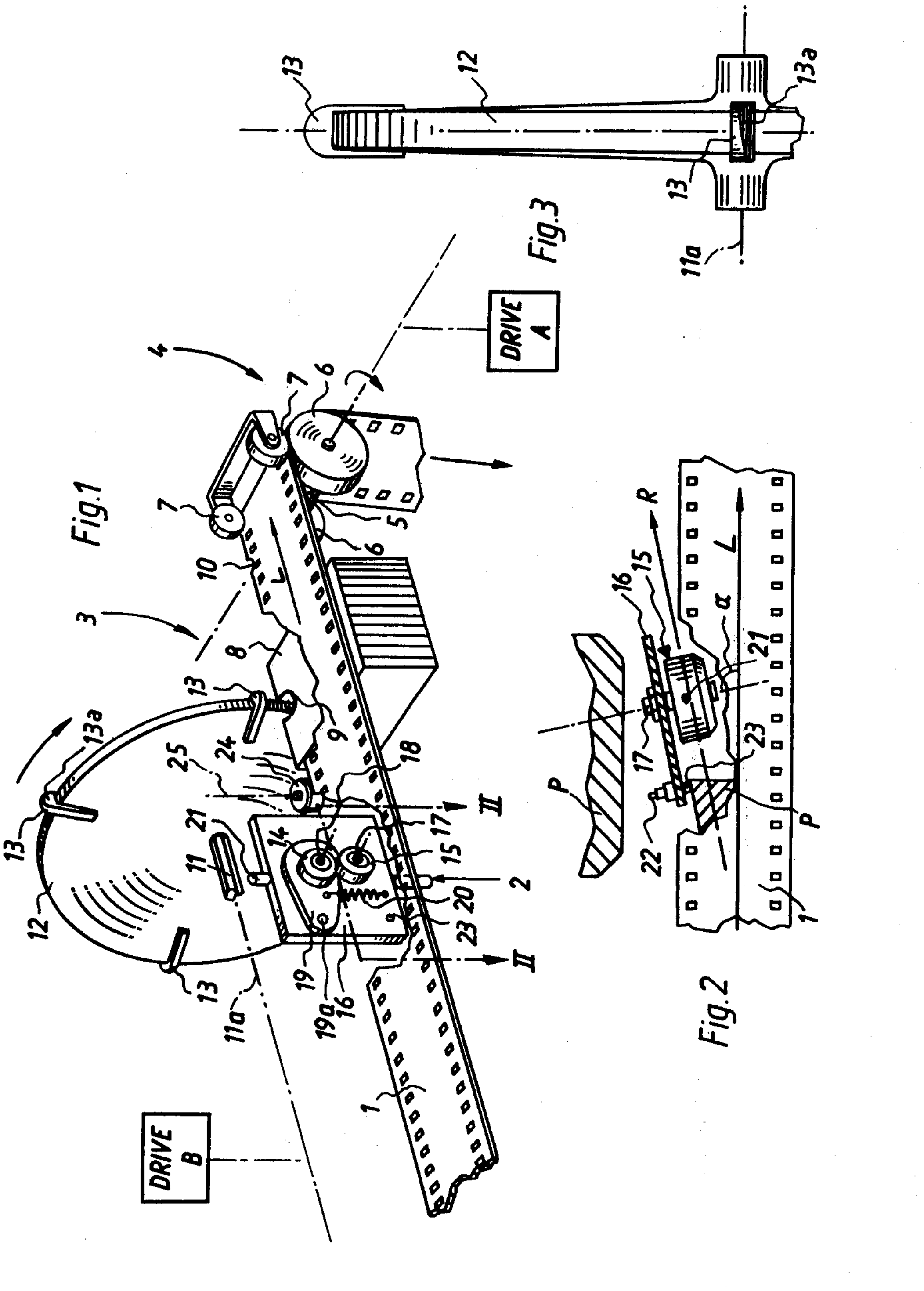
FIG. 1 is a perspective view, partly broken away, showing an apparatus embodying the invention.
FIG. 2 is a fragmentary section, taken on line II—II of FIG. 1.
FIG. 3 is a fragmentary edge-elevational view of a component of the apparatus of FIG. 1.

An exemplary embodiment of the novel apparatus is illustrated in FIGS. 1–3. As the drawing shows, a film strip 1 (which may be composed of two or more, e.g. a large number of spliced-together shorter film strips) is advanced in the direction of arrow L by a film transporting mechanism 4. The film strip 1 travels through a film-guiding station 2 and thereupon through a notching station 3 where one of its longitudinal edges is provided with successive notches 10 (one shown).

The transport mechanism 4 employs a roller 5 connected at its opposite ends with two friction wheels 6 each of which cooperates—and forms a nip with—a pressure roller 7. The rollers 7 are biased against their cooperating friction wheels 6 by suitable biasing means (not illustrated), such as one or more springs. The shaft of roller 5 and wheels 6 is driven by the diagrammatically illustrated drive A which may drive the wheels 6 stepwise (e.g. an electric step-motor) or continuously. FIG. 1 shows that the axial spacing of the wheels 6 from one another (and also that of roller 7) is so selected that essentially only the longitudinal edge portions of the film strip 1 are engaged, not the center part thereof.

The notching station 3 (FIG. 1) includes a film table 8 over which the film strip travels. A portion of table 8 is configurated (or provided with) a counter-punch 9 which, in cooperation with the dies or punches 13 punches notches into the edge of film strip 1. In its simplest form the counter-punch 9 can be a groove in an edge of the table 8, and the edge bounding the upper end of the groove then cooperates with the punches 13. Laterally adjacent the travel path of film strip 1 is mounted a punching wheel 12 which rotates on shaft 11 about an axis 11*a;* in the illustrated embodiment the axis 11*a* extends parallel to the direction of movement L and is located in a plane which is somewhat above the plane of the film strip 1 (i.e. of the upper surface of the table 8) but which could be located lower than this.

The periphery of the wheel 12 carries four equiangularly spaced punches 13; however, fewer or more than four may be provided instead. The portions of the punches which project radially beyond the periphery are of semicircular outline (see FIG. 3) dimensioned to be able to enter into the groove which forms part of the counter-punch 9. FIG. 3 also shows that the punches 13 have surfaces facing forwardly as seen with reference to the direction of rotation of wheel 12) which are inclined in the illustrated manner. Thus, when the cutting edge bounding the respective surface 13*a* cooperates with the cutting edge of counterpunch 9, it does so not over the entire length of the cutting edge of surface 13*a* but only gradually. In other words the shearing-off of a portion of the film strip edge (to form a notch 10) progresses circumferentially of the respective surface 13*a* as each punch enters progressively further into the upper end of the groove forming part of the counter-punch 8. This makes for a cleaner cut and requires less cutting energy.

The wheel 12 is driven in rotation by a diagrammatically illustrated drive B which may rotate it stepwise (e.g. an electric step-motor) or continuously. When there are four of the punches 13 (as shown) and the wheel 12 is driven stepwise (intermittently), then the rest position of the wheel (the position in which it comes to a halt before the next stepwise turn begins) is so selected that in this position the next-to-cut punch 13 is located above the table 8 at an angle of 45°. Of course, this can differ depending upon the number of punches 13.

The film guiding station 2 comprises a pair of cooperating rolls 14, 15 which together form a nip through which the film strip 1 travels, i.e. the plane in which the film strip moves passes through this nip. One of these rolls (here the roll 15) is journalled for rotation about a pivot 17 which is mounted on an upstanding plate 16. The pivot 18 of the other roll (here the roll 14) is secured to a pivot arm 19 which in turn is connected to the plate 16 so that it can pivot relative thereto about axis 19*a.* A spring 20 has its opposite ends connected to the arm 19 and the plate 16 to urge the arm 19 (and hence the roll 14) towards the roll 15.

Plate 16 is mounted for turning movement about an upright axis 21 (if the film strip 1 is guided for horizontal advancement). Opposite sides of the plate 16 are provided with adjustable abutments (e.g. screws) 22 and 23 which cooperate with fixed portions P (diagrammatically shown in FIG. 2) so that the angle $\alpha$ through which plate 16 can pivot to become inclined to the direction L, is limited. Since the abutments 22 and 23 are adjustable, the angle $\alpha$ can be varied.

Intermediate the station 2 and the table 8, immediately ahead of the latter, a roll 24 is mounted for rotation about an upright axis 25 which extends normal to the plane of film strip 1; roll 24 is a film guide roll and is advantageously journalled for rotation by means of a (not illustrated) anti-friction bearing. Roll 24 constitutes an abutment for that longitudinal edge of film strip 1 which is to be formed with the notches 10.

THE OPERATION

Film strip 1 is withdrawn from a (not illustrated) pay-out reel and advanced by the mechanism 4 to a (not illustrated) take-up reel. The friction rolls 14, 15 engage only the edge portion of film strip 1, under the pressure furnished by the action of spring 20. Due to the freedom of plate 16 to pivot about axis 21, the movement of film strip 1 in the direction L and the friction between the film strip 1 and the rolls 14, 15, the plate 16 is turned about axis 21 in counterclockwise direction (see FIG. 2), with the result that the axes 17, 18 of the rolls move to a position in which they include with the direction L the angle $\alpha$ which in the illustrated embodiment is greater than 90°. (FIG. 2). The direction of rotation R of the rolls 14, 15 now is inclined in direction outwardly away from the longitudinal center line of the film strip 1 (FIG. 2). Since the film strip has some flexibility this means that the rolls 14, 15 superimpose upon its travel in direction L a laterally outwardly directed component which assures that the edge to be notched will always be in engagement with (and guided by) the circumference of roller 24. In turn, this guarantees that every longitudinal increment of film strip 1 will enter the notching station 3 in precisely the same position so that all notches 10 will be of identical depth. If the direction of advancement of the film strip 1 is reversed (e.g. to take the now notched strip back up on the pay-out reel) the friction between film strip 1 and rolls 14, 15 automatically results in a return-pivoting of plate 16 to a position in which it (i.e. its plane) extends parallel to the direction L; engagement of the abutment 22 with its cooperating portion P prevents pivoting of the plate 16 beyond this position of parallelism.

Upstream of the stations 2, 3 (i.e. to their left in FIG. 1) the film strip 1 may pass through a (not illustrated) device which photo-electrically scans the film strip transparency to detect the blank transverse film portions which separate successive film frames. Such devices are known per se (U.S. Pat. No. 3,469,480) and generate a signal when they detect such blank portions. This signal may then be used to interrupt the advancement of film strip 1 in the direction L; due to the correlation between the distance of the scanning location from station 3 and the number of film frames in this distance, each successive film frame will be halted precisely in the required position at station 3. The same signal can be used to initiate rotation of the wheel 12 so that the punch 13 which is in readiness (in FIG. 1 the one located immediately above the film strip) enters into the groove of counter-punch 9 and thus punches a notch. As soon as this entry occurs, a signal may be generated to resume advancement of film strip 1 in the direction L. However, the scanning of the film strip and the manner in which the signals are generated, do not form a part of this invention.

It has been found that the apparatus according to the invention makes it possible to substantially triple the number of notches that can be formed per unit time, as compared with the prior-art reciprocating punches. Moreover, the apparatus can be used continuously instead of intermittently, i.e. the film strip 1 and/or the wheel 12 can travel continuously instead of stepwise.

Because each punch 13 moves relative to film strip 1 and counter-punch 9 in an arcuate path, the danger of contamination of the punch 13 with adhesive from a splice (should a notch coincide with a splice) is largely avoided because the punch 13 pulls out of the notch in this arcuate path and the adhesive tends to pull off the punch during this movement. The punched-out film portions are flung off in radial direction and can not become lodged on the table 8 or the counter-punch 9 as is the case in the prior art. Because the spacing between the cooperating cutting edges of punches 13 and counter-punch 9 can remain constant if the wheel is appropriately journalled, there is no danger of contact (and wear) between these cutting edges so that the useful life of the punches and the counter-punch is increased; this is usually impossible in the case of reciprocating punches which simply cannot be guided accurately enough.

The additional time gained from the increase in the notching frequency per unit time may in part be used to transport the film strip 1 with lesser acceleration and deceleration (during stepwise advancement) than would otherwise be possible. This, in turn, makes it possible to position each film frame more precisely on the table 8. Even if some of the saved time is used in this manner, the frequency of notching per unit time will still be twice that which is obtainable with the prior-art equipment.

The number of punches 13 can be selected at will, depending upon the size (diameter) of the wheel 12 and of the drive therefore. The counter-punch 9 is advantageously made of a tantalum-alloy which is commercially available under the tradename "Tantung" from the VR/Wesson Co, Waukegun, Ill. However, other materials (e.g. hardened steel) are of course also usable.

If desired, the axis 11*a* of wheel 12 could extend normal to the direction L (to intersect the two longitudinal edges of film strip 1) and be located in the plane of the film strip. The punches would then be laterally adjacent of the circumference of the wheel 12, on that axial face of the wheel which faces the film strip edge to be notched.

While the invention has been illustrated and described as embodied in an apparatus for notching film strips, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In an apparatus for notching an edge of an elongated web, particularly of a strip of photographic film, a combination comprising means for advancing an elongated web in a path; and means for notching a longitudinal edge of the web, including a wheel mounted for rotation adjacent said path, at least one punching die on said wheel adjacent the periphery thereof and having a punching portion bounded by a first severing edge shaped to correspond to a notch to be formed, and a stationary counterpunch provided with a cutout shaped to matingly receive said punching portion and being bounded by a second severing edge which cooperates with said first severing edge to punch notches into the web during rotation of the wheel.

2. A combination as defined in claim 1; further comprising means mounting said wheel for rotation about an axis extending parallel to said path; and wherein at least said punching portion projects in radial direction from said periphery.

3. A combination as defined in claim 2, wherein said mounting means comprises a shaft which defines said axis and is located in a plane different from but parallel to the plane of the web being advanced in said path.

4. A combination as defined in claim 1; further comprising means mounting said wheel for rotation about an axis which is located substantially in the plane of the web being advanced and which includes an angle with said path; and wherein at least said punching portion projects transversely of said path and of the direction of advancement of the web.

5. A combination as defined in claim 1; further comprising a plurality of additional punching dies, all of said dies being angularly spaced about the periphery of said wheel.

6. A combination as defined in claim 1 said second edge being located in a plane extending normal to the general plane of said wheel; and wherein said punching portion has a punching surface which is bounded by said first edge and is inclined circumferentially of said wheel opposite to the direction of rotation thereof so that said punching surface cooperates with said second edge in successive stages which progress as said punching surface passes said second edge during rotation of said wheel.

7. A combination as defined in claim 1 wherein said punching portion has a punching surface bounded by said first edge, said punching surface and said second edge having such relative angles of inclination that said edges cooperate with one another in successive stages which progress as said punching surface passes said second edge during rotation of said wheel.

8. A combination as defined in claim 1, wherein said counter-punch is of a tantalum alloy.

9. A combination as defined in claim 1; and further comprising means for rotating said wheel intermittently.

10. A combination as defined in claim 1; and further comprising means for rotating said wheel continuously.

11. A combination as defined in claim 1, wherein said advancing means comprises a drive for intermittently advancing the web in said path.

12. A combination as defined in claim 1, wherein said advancing means comprises a drive for continuously advancing the web in said path.

* * * * *